United States Patent [19]
Takagi

[11] Patent Number: 5,854,715
[45] Date of Patent: Dec. 29, 1998

[54] METHOD FOR TRACKING A READ HEAD ON A DATA AREA ON A DISK AND DISK APPARATUS USING THE METHOD

[75] Inventor: Masahiro Takagi, Kawasaki, Japan

[73] Assignee: Fujitsu Limited, Kawasaki, Japan

[21] Appl. No.: 942,239

[22] Filed: Oct. 1, 1997

Related U.S. Application Data

[63] Continuation of Ser. No. 519,569, Aug. 25, 1995, abandoned.

[30] Foreign Application Priority Data

Nov. 17, 1994 [JP] Japan ................................. 6-283665

[51] Int. Cl.$^6$ ................................................... G11B 5/09
[52] U.S. Cl. ................ 360/53; 360/77.08; 360/78.14; 360/78.04; 360/77.02
[58] Field of Search ........................ 360/53, 51, 77.08, 360/78.14, 76, 77.04, 78.04, 77.02; 369/32

[56] References Cited

U.S. PATENT DOCUMENTS

| | | | |
|---|---|---|---|
| 4,802,033 | 1/1989 | Chi | 360/75 X |
| 5,073,833 | 12/1991 | Best | 360/77.05 |
| 5,235,478 | 8/1993 | Hoshimi | 360/77.08 |
| 5,257,149 | 10/1993 | Meyer | 360/78.14 |
| 5,313,340 | 5/1994 | Takayama | 360/51 X |

FOREIGN PATENT DOCUMENTS

| | | |
|---|---|---|
| 57-18060 | 1/1982 | Japan . |
| 58-111106 | 7/1983 | Japan . |
| 61-29462 | 2/1986 | Japan . |
| 3-2472 | 1/1991 | Japan . |
| 3-268283 | 11/1991 | Japan . |
| 6-89546 | 3/1994 | Japan . |
| 6-111493 | 4/1994 | Japan . |

OTHER PUBLICATIONS

"Write Narrow/Head Wide Home Address Sectors in Magnetic Recording Book File", IBM Tech Disc. Bul., vol.29, No.1, Jun. 1986, pp. 168–170; 360–78.14.

*Primary Examiner*—Alan Faber
*Attorney, Agent, or Firm*—Greer, Burns & Crain, Ltd.

[57] ABSTRACT

In a magnetic disk apparatus using a composite thin-film magnetic head, high-speed reading and writing operations are achieved without increasing a read error rate and without decreasing a signal-to-noise ratio of read signals. The magnetic head is moved along an arc-like line on the magnetic disk having a track including a plurality of sectors. Each of the sectors has a data area and an identification area displaced from the data area due to movement of the magnetic head relative to the magnetic disk. A position identification sector which is positioned ahead of a target sector is determined based on a predetermined factor representing a period of time. An offset operation of the magnetic head is performed after the position identification sector is detected by a read head so that the magnetic head is moved from a first position to a second position. The read head tracks on the identification area when the head is at the first position and the read head tracks on the data area when the head is at the second position. The predetermined factor is measured since the identification sector was detected. A data reading operation is performed when a measured value of the predetermined factor reaches a predetermined value.

20 Claims, 15 Drawing Sheets

METHOD FOR TRACKING A READ HEAD ON A DATA AREA ON A DISK AND DISK APPARATUS USING THE METHOD

This application is a continuation of application(s) Ser. No. 08/519,569 filed on Aug. 25, 1995, now abandoned.

BACKGROUND OF THE INVENTION

1. Field of the Invention

The present invention generally relates to a recording and reproducing method and, more particularly, to a recording and reproducing method in which a recording and reproducing operation is performed by tracking a recording and reproducing head on a track formed on a disk-like recording medium.

Recently, magnetic disk apparatuses are widely used as an externally attached memory device for a computer. In order to increase a memory capacity, a composite thin-film magnetic head has been used in the magnetic disk apparatuses. The composite thin-film magnetic head is formed by a combination of a thin-film magnetic head and a magnetoresistance element (MR element). The composite thin-film magnetic head has disadvantages in that an output level of signals and a signal-to-noise ratio (SNR) are decreased when a read operation is performed.

2. Description of the Related Art FIG. 1 is a plan view of an example of a conventional magnetic disk apparatus. In a magnetic disk apparatus 11 shown in FIG. 1, a magnetic head 14 is mounted on an end of an arm 13 via a support spring 13a. The arm 13 is pivotally supported by a pivot 15.

A portion 16 of the arm 13 extends opposite to the magnetic head 14. A coil 17 is wound on the portion 16. Two magnets 18a and 18b are arranged under the coil 17. The coil 17 and the magnets 18a and 18b constitute a voice coil motor (VCM). The arm 13 and the VCM together constitute an actuator 12 for moving the magnetic head 14. The actuator 12 is actuated when a current flows to the coil 17 from a printed-circuit board 21 via flexible printed-circuit board 22.

A magnetic disk 20 is mounted on a spindle 19 of a sensorless-type spindle motor (not shown) so as to be rotated. The arm 13 is rotated about the pivot 15 by the actuator 12 so that the magnetic head 14 is moved substantially in a radial direction of the magnetic disk 20 as indicated by a double-dashed chain line in FIG. 1.

The magnetic head 14 uses an MR head using an MR element which is suitable for a high-density recording. Since the MR element head is exclusively used for reading, the magnetic head 14 further comprises a recording head which is normally a thin-film head. This type of magnetic head is referred to as a composite thin-film magnetic head.

The conventional composite thin-film magnetic head 14 is shown in FIGS. 2A and 2B. FIG. 2A is a partially cut-away perspective view of the conventional thin-film type magnetic head 14, and FIG. 2B is a cross-sectional view of the magnetic head 14 shown in FIG. 2A. The magnetic head 14 comprises the MR head 31 and the recording head 37 as shown in FIG. 2B.

The MR head 31 comprises a lower magnetic shield layer 35b, an MR element 33, a conductive layer 34 and an upper magnetic shield layer 35a. The lower magnetic shield layer 35b is formed on a non-magnetic substrate 32. The MR element 33 has a rectangular shape. A portion of the conductive layer 34 is cut away so that opposite sides of the MR element 33 are fixed to the conductive layer 34. The MR element 33 and the conductive layer 34 are interposed between the upper magnetic shield layer 35a and the lower magnetic shield layer 35b. A non-magnetic insulating material 36 is filled between the conductive layer 34 and each of the upper magnetic shield layer 35a and the lower magnetic shield layer 35b. The MR element 33 and the conductive layer 34 are electrically insulated by the non-magnetic insulating material 36.

The recording head 37 is an inductive-type recording head. The recording head 37 comprises the upper magnetic shield layer 35a, an insulating layer 39, a thin-film coil 40 and an upper magnetic pole layer 41. The upper magnetic shield layer 35a of the MR head 31 functions as a lower magnetic pole layer of the recording head 37. The insulating layer 39 is provided between the lower magnetic pole layer 35a and the upper magnetic pole layer 41 so that a gap 38 is formed between the upper and lower magnetic pole layers 35a and 41. The thin-film coil 40 is embedded in the insulating layer 39 so as to generate a magnetic field in the gap 38 to perform a writing (recording) operation. A protective insulating layer 42 is provided on the upper magnetic pole layer 41.

As shown in FIG. 2B, in the magnetic head 14, the MR element 33, which performs a reading operation, is a distance L apart from the gap 38, which performs the writing operation, in the longitudinal direction of the magnetic head 14. When the magnetic head 14 is moved in the radial direction of the magnetic disk 20, an angle between a tangent line of a track on the magnetic disk 20 and the longitudinal direction of the magnetic head 14 is varied. This angle is referred to as a yaw angle. This is because the magnetic head 14 is moved by a rotation of the arm 13, and thus the magnetic head 14 does not move along a straight line but along an arc-like line.

FIG. 3 illustrates a positional relationship between a read core and a write core of the magnetic head 14 and a track formed on the magnetic disk 20. In FIG. 3, the write core 37 corresponds to the gap 38 which performs the writing operation, and the read core corresponds to the MR element 33 which performs the reading operation.

When the yaw angle is 0 degrees, wherein the longitudinal direction of the magnetic head is aligned with the tangent line of the track, the write core 37 and the read core 33 are properly positioned within the track. However if the yaw angle is provided, for example +10 degrees or −10 degrees as shown in FIG. 3, the read core 33 is displaced from the track by a length a or b when the write core 37 is properly positioned within the track. If the read core 33 is displaced from the track, a part of the read core 33 is positioned on an adjacent track. In this condition, the read core picks up an undesired noise, and thus a SNR of read signals is decreased.

One solution for this problem is to reduce a width d of the read core 33 relative to the write core 37. As shown in FIG. 3, if the width of the write core 33 is reduced to a width c (c=d−a−b), an entire read core 33 is positioned on the track even if the yaw angle of ±10 degrees is provided to the magnetic head. However, in this manner, an effective reading operation cannot be performed due to a reduced area of the reading head.

Another solution is to move (offset) the magnetic head 14 when a reading operation is performed so that an entire read core 33 is positioned within the track.

In the above-mentioned conventional magnetic recording and reproducing apparatus 11, when the magnetic disk 20 is formatted by the magnetic head 14, an ID area and a data area following the ID area are formed in a condition in which the data area is displaced from the ID area in a direction perpendicular to the longitudinal direction of the track. In this condition, when a reading operation is performed, the read core 33 is simply moved to the data area. However, when a writing operation is performed, the ID area is read first, and then the writing operation is performed to the data area. That is, the ID area is read by offsetting the read core 33 to the ID area and then the writing operation is performed after the magnetic head is moved to the data area.

However, since the offsetting of the magnetic head 14 takes normally 1 ms, which is a considerably long period of time, it is normal to read the ID area without offsetting the magnetic head 14. Accordingly, there is a problem in that a read error rate for reading the ID area is increased.

Japanese Laid-Open Utility Model Application No. 3-2472 discloses a method in which the magnetic head is offset when a reading operation on the ID area is performed and then the writing operation is performed on the data area without moving the magnetic head. This method is suggested for eliminating displacement of the data area with respect to the ID area when the magnetic recording and reproducing apparatus is subject to a variation in temperature.

Japanese Laid-Open Patent Application No. 3-268283 discloses a method in which an amount of offset of the magnetic head is determined by considering a previous offset so that the magnetic head is moved to a desired position in a short time. This method is used for offsetting the magnetic head when a displacement of the magnetic disk is produced due to deviation in a chucking position of the magnetic disk. By using this method, a period for offsetting the magnetic head is shortened. However, this period corresponds to at least one revolution of the magnetic disk. That is, the writing operation to the data area must be performed one revolution after the reading operation to the ID area is performed.

Additionally, it is suggested that an error occurring in the ID information is corrected by comparing it with an expected value so that an access time is not increased when a bit error rate is increased.

Japanese Laid-Open Patent Application No. 6-111493 discloses a method in which a write ID area and a read ID area are separately provided in the ID area when the magnetic disk is formatted. However, even if the ID area is divided into the read ID areas and the write ID areas, a read error rate for the write ID area is still increased due to the displacement of the ID area.

SUMMARY OF THE INVENTION

It is a general object of the present invention to provide an improved and useful recording and reproducing method in which the above-mentioned problems are eliminated.

A more specific object of the present invention is to provide a recording and reproducing method used with a composite thin-film magnetic head by which method high-speed reading and writing operations are achieved without increasing a read error rate due to a decrease in an output level of read signals and without decreasing a signal-to-noise ratio of the read signals.

In order to achieve the above-mentioned objects, there is provided according to one aspect of the present invention a recording and reproducing method for recording and reproducing data on a disk-like recording medium using a head having a read head for recording and a write head for reproducing, the head being moved substantially in a radial direction of the recording medium along an arc-like line, the recording medium having a track comprising a plurality of sectors each having a data area storing data and an identification area storing identification information of the data, the data area being displaced from the identification area due to movement of the head relative to the recording medium, the recording and reproducing method comprising the steps of:

a) determining a position identification sector which is positioned a predetermined number of sectors ahead of a target sector on which a reading operation is to be performed, the position identification information being determined based on a predetermined factor representing a period of time;

b) detecting the position identification sector by the read head;

c) performing an offset operation of the head after the position identification sector is detected so that the head is moved from a first position to a second position, the read head tracking on the identification area when the head is at the first position and the read head tracking on the data area when the head is at the second position;

d) measuring the predetermined factor since the identification sector was detected; and e) performing a data reading operation when a measured value of the predetermined factor reaches a predetermined value.

According to the above-mentioned method, a position of the target sector is detected by measuring the predetermined factor which may be a number of sectors or a number of bytes between the target sector and the position identification sector. Since the offset operation of the head is completed while the predetermined factor is measured, a data reading operation is performed immediately after the head reaches the target sector. Thus, a high-speed processing for the data reading operation can be achieved without increasing the read error rate.

Additionally, there is provided according to another aspect of the present invention a recording and reproducing method for recording and reproducing data on a disk-like recording medium using a head having a read head for recording and a write head for reproducing, the head being moved substantially in a radial direction of the recording medium along an arc-like line, the recording medium having a track comprising a plurality of sectors each having a data area storing data and an identification area storing identification information of the data, the data area being displaced from the identification area due to movement of the head relative to the recording medium, the recording and reproducing method comprising the steps of:

a) performing an offset operation of the head when a data read command is supplied so that the head is moved from a first position to a second position, the read head tracking on the identification area when the head is at the first position and the read head tracking on the data area when the head is at the second position;

b) detecting an index signal provided for each track on the recording medium when a predetermined period of time has elapsed since the offset operation was started;

c) detecting a target sector on which a data read operation is to be performed when the index signal is detected, the target sector being detected by measuring a predetermined factor representing a period of time since the index signal was detected; and d) performing a data reading operation for the data area of the target sector when the target sector is detected.

According to the above-mentioned invention, the offset operation is preformed immediately after the data read command is supplied. The index signal is then detected to determine the target sector by measuring the predetermined factor representing the period of time during which the head moves from a position of the index signal to the target sector. Since a data reading operation is performed immediately after the head reaches the target sector, a high-speed processing for the data reading operation can be achieved without increasing read error rate.

According to another aspect of the present invention, there is provided recording and reproducing apparatuses using the above-mentioned methods.

Other objects, features and advantages of the present invention will become more apparent from the following detailed description when read in conjunction with the accompanying drawings.

DETAILED DESCRIPTION OF THE PREFERRED EMBODIMENTS

Figure 5:
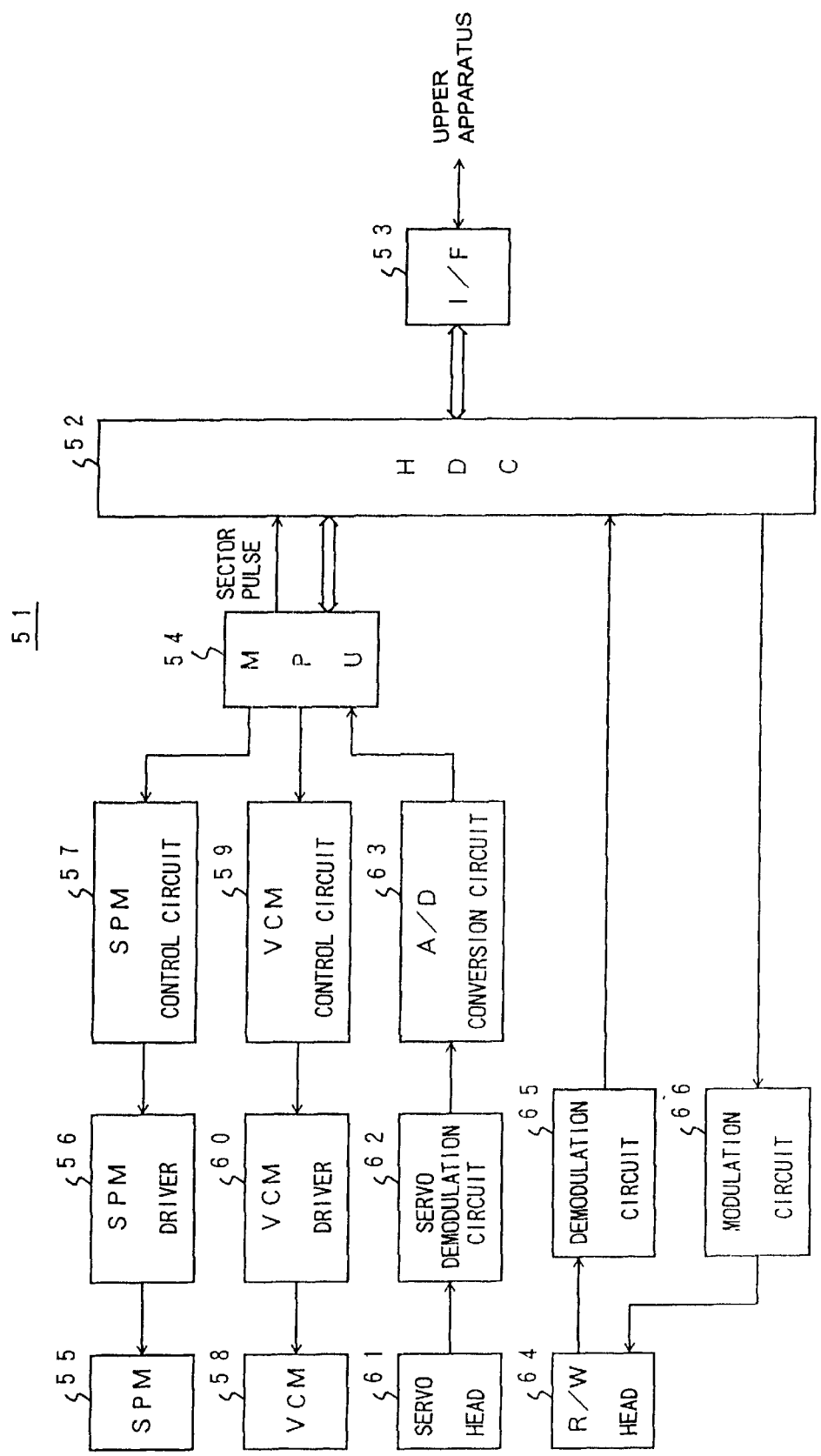
FIG. 5 is a block diagram of a first embodiment of a magnetic disk apparatus according to the present invention.
Figure 6:
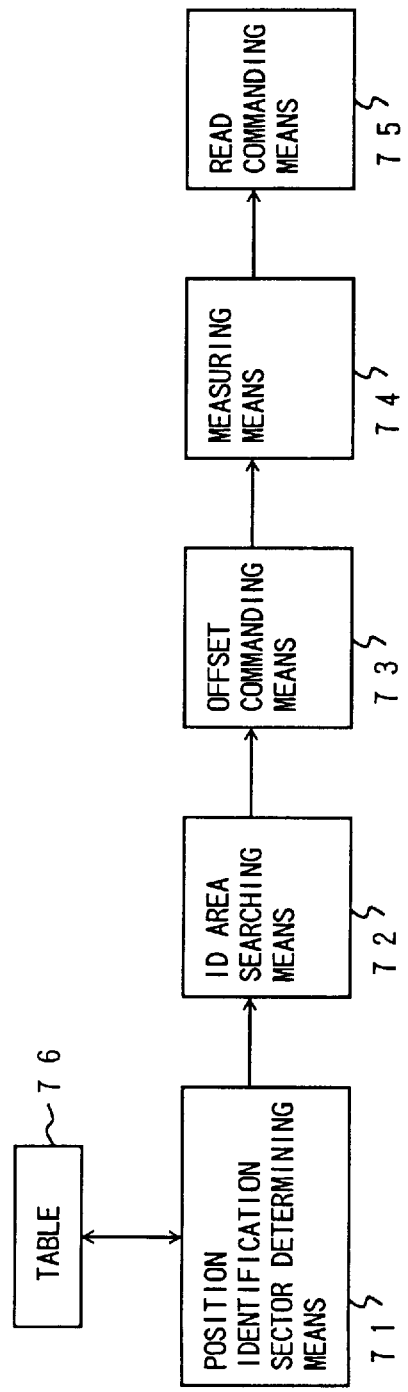
FIG. 6 is a block diagram of a hard disk controller shown in FIG. 5.

A description will now be given of a first embodiment of a magnetic disk apparatus according to the present invention. FIG. 5 is a block diagram of the magnetic disk apparatus 51 according to the present invention. FIG. 6 is a block diagram of a hard disk controller shown in FIG. 5. It should be noted that the mechanical construction of the magnetic disk apparatus 51 is the same as that of the magnetic disk apparatus shown in FIGS. 1 and 2.

In FIG. 5, a hard disk controller (HDC) 52 is connected to an upper apparatus via an interface (I/F) 53. A microprocessor unit (MPU) 54, which performs various controls, is connected to the HDC 52.

A magnetic disk (not shown in FIG. 5) is driven by a spindle motor 55. An operation of the spindle motor (SPM) 55 is controlled by the MPU 54 via an SPM driver 56 and an SPM controlling circuit 57.

Figure 1:
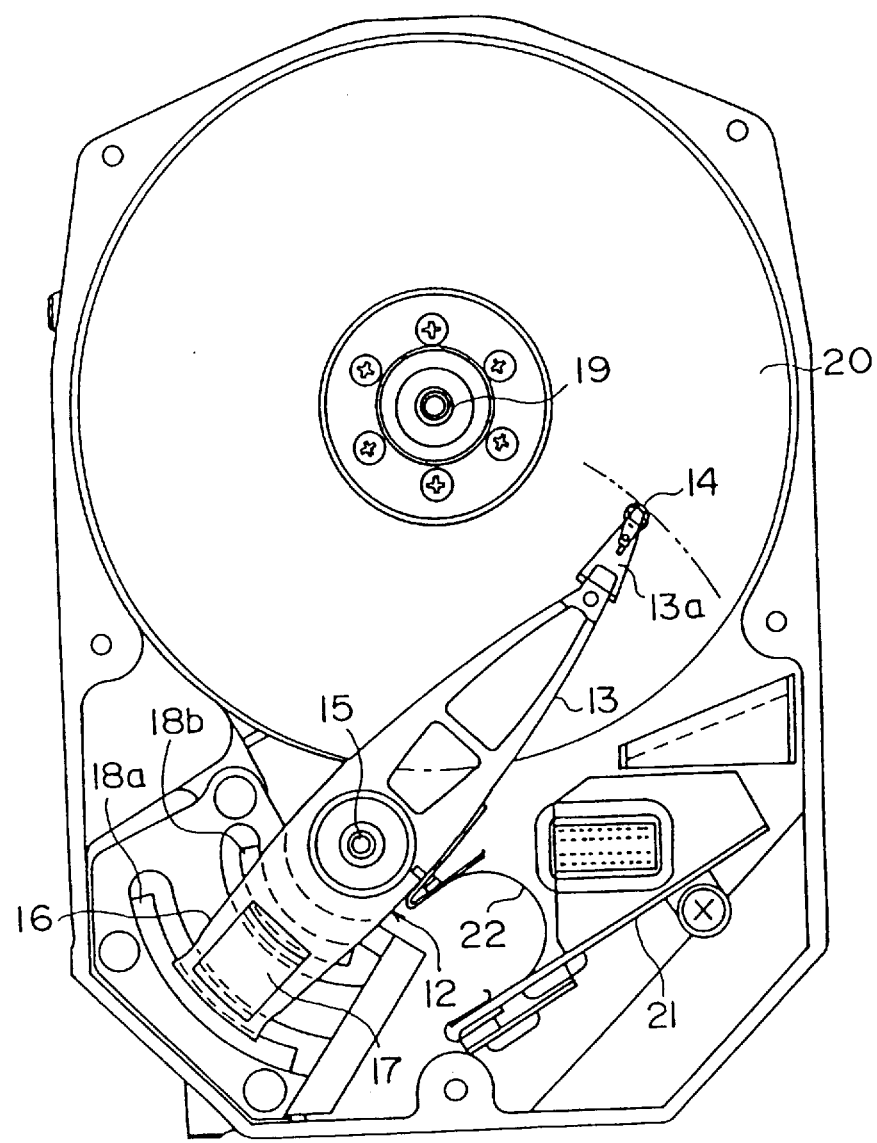
FIG. 1 is a plan view of an example of a conventional magnetic disk apparatus.
Figure 2A:
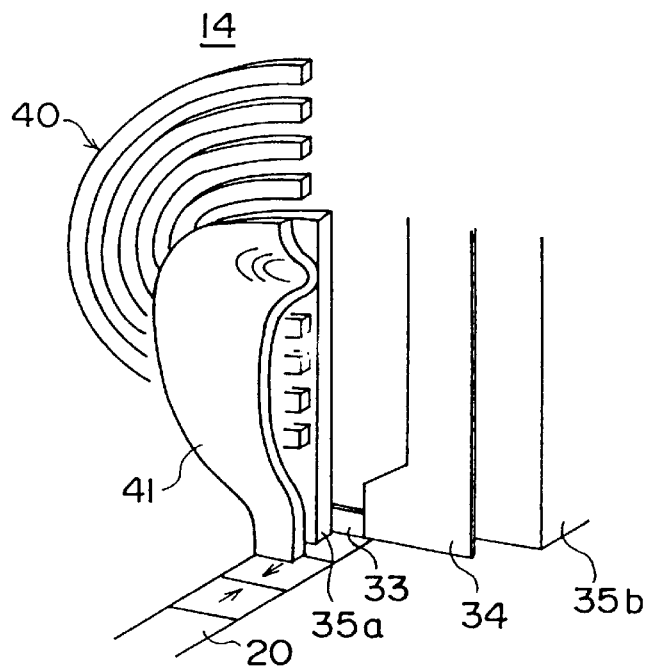
FIG. 2A is a partially cut-away perspective view of the conventional thin-film type magnetic head shown in FIG. 1.
Figure 2B:
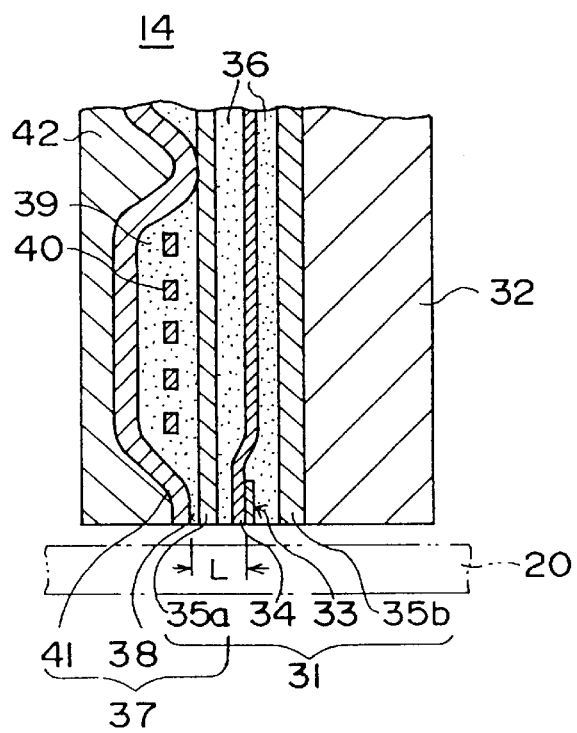
FIG. 2B is a cross-sectional view of the magnetic head shown in FIG. 2A.
Figure 3:
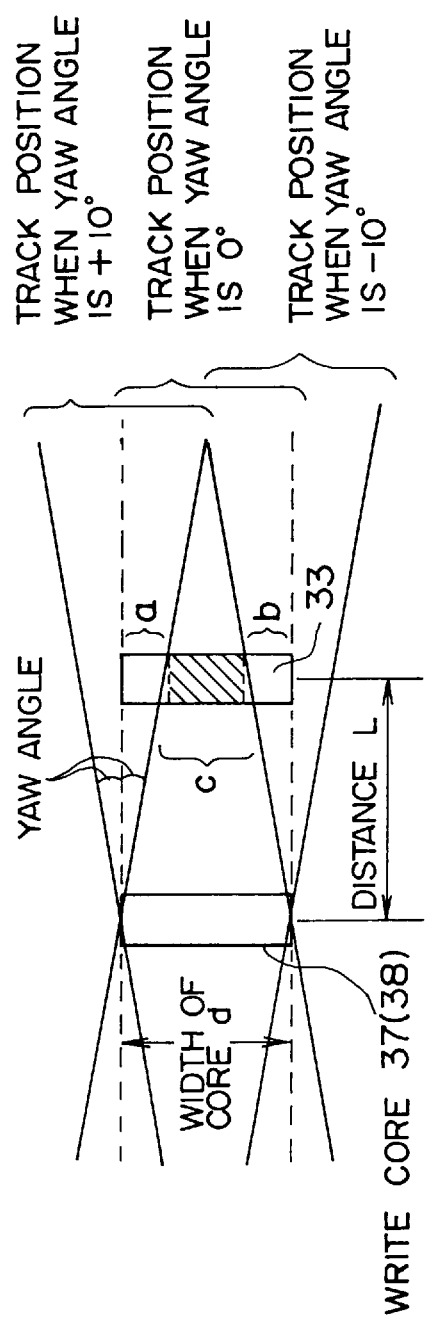
FIG. 3 is an illustration for explaining a positional relationship between a read core and a write core of a magnetic head and a track formed on a magnetic disk.
Figure 4:
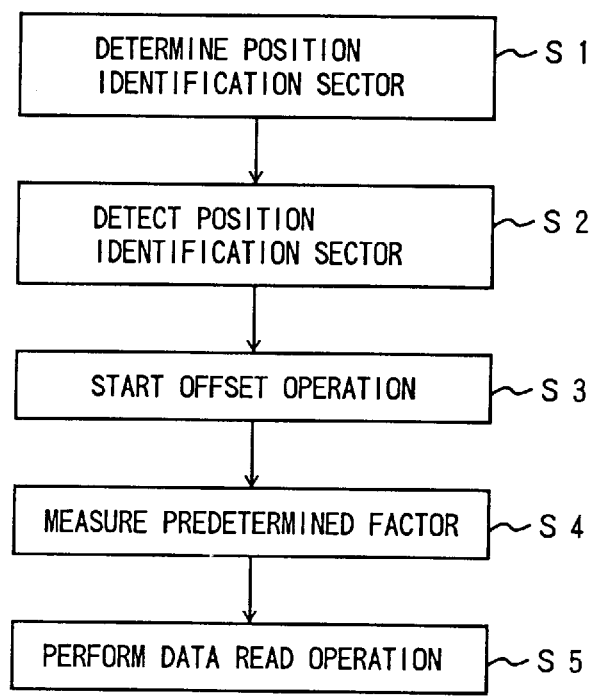
FIG. 4 is a flowchart for explaining the principle of the present invention.

A read/write (W/R) head 64, which corresponds to the magnetic head 14 shown in FIG. 1, is provided in the magnetic disk apparatus 51. Read signals are transmitted from a read head 64a (refer to FIG. 7) of the R/W head 64 to the HDC 52 via a demodulation circuit 65. Write signals are transmitted from the HDC 52 to a write head 64b (refer to FIG. 7) of the R/W head 64 via a modulation circuit 66.

The W/R head 64 is moved by a voice coil motor (VCM) 58. An operation of the VCM 58 is controlled by the MPU 54 via a VCM driver 60 and a VCM controlling circuit 59.

The magnetic disk apparatus 51 further comprises a single servo head 61 which reads servo signals recorded on the magnetic disk. The servo signals read by the servo head 61 are sent to the MPU 54 via a servo demodulation circuit 62 and an analog-to-digital (A/D) converter circuit 63.

The HDC 52 comprises, as shown in FIG. 6, position identification sector determining means 71, ID area searching means 72, offset commanding means 73, measuring means 74 and read commanding means 75. The position identification sector determining means 71 determines a position identification sector used for reading and writing a target sector on the magnetic disk. The ID area searching means 72 searches the position identification sector by using an ID area. The offset commanding means 73 controls an offset operation of the R/W head 64 by driving the VCM 58. The offset operation is performed by moving the R/W head 64 from a position in which the R/W head 64 is tracking on an ID area to a position in which the R/W head 64 is tracking on a data area. The measuring means 74 counts the number of sector pulses when the offset operation is started so as to determine the number of sectors passed by the R/W head 64. The number of sectors corresponds to a predetermined factor which may be a period of time or the number of bytes instead of the number of sectors. The read commanding means 75 commands the R/W head 64 to perform a reading operation when the R/W head 64 tracks on the data area of the target sector.

The position identification sector determining means 71 further comprises a table 76 in which sector information corresponding to a period of time needed to perform the offset operation is stored. An interval between the position identification sector and the target sector to which a reading operation or a writing operation is performed can be varied by the sector information in accordance with the period of time needed to perform the offset operation.

A description will now be given of an operation of the magnetic disk apparatus 51. A data writing operation will be described first.

Figure 7:
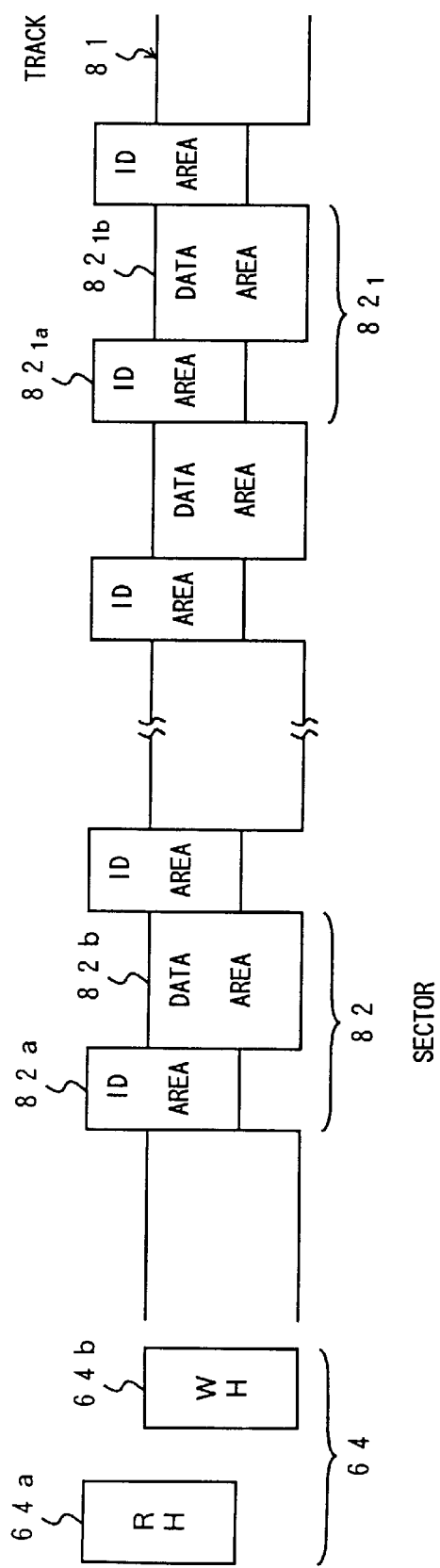
FIG. 7 is an illustration for explaining a data writing operation.

FIG. 7 shows a positional relationship between a track 81 on the magnetic disk and a read head 64a and a write head 64b of the R/W head 64. The track 81 comprises a single index area and a plurality of sectors $82_1 a \ldots 82_1 n$ (hereinafter referred to as 82 as a whole). Each of the sectors 82 comprises an ID area $82_1 a \ldots 82_1 n$ (hereinafter referred to as 82a as a whole) and data areas $82_1 b \ldots 82_b n$ (hereinafter referred to as 82b as a whole). Data is erasably recorded on the data areas 82b.

The ID areas 82a are provided for recording information which is written when the magnetic disk is formatted. The contents of the ID area are not erasable when the magnetic disk is in a normal operation. The contents of the information include a track number, a head number, a sector number, a number of bytes and information for error correction codes (ECC).

When the R/W head 64 has a yaw angle due to a movement produced by the actuator, there is a displacement between the read head 64a and the write head 64b in a direction of a width of the track 81. Accordingly, when the magnetic disk is formatted in this condition, the ID areas 82a and the data areas 82b are formed in a displaced relationship.

Figure 9:
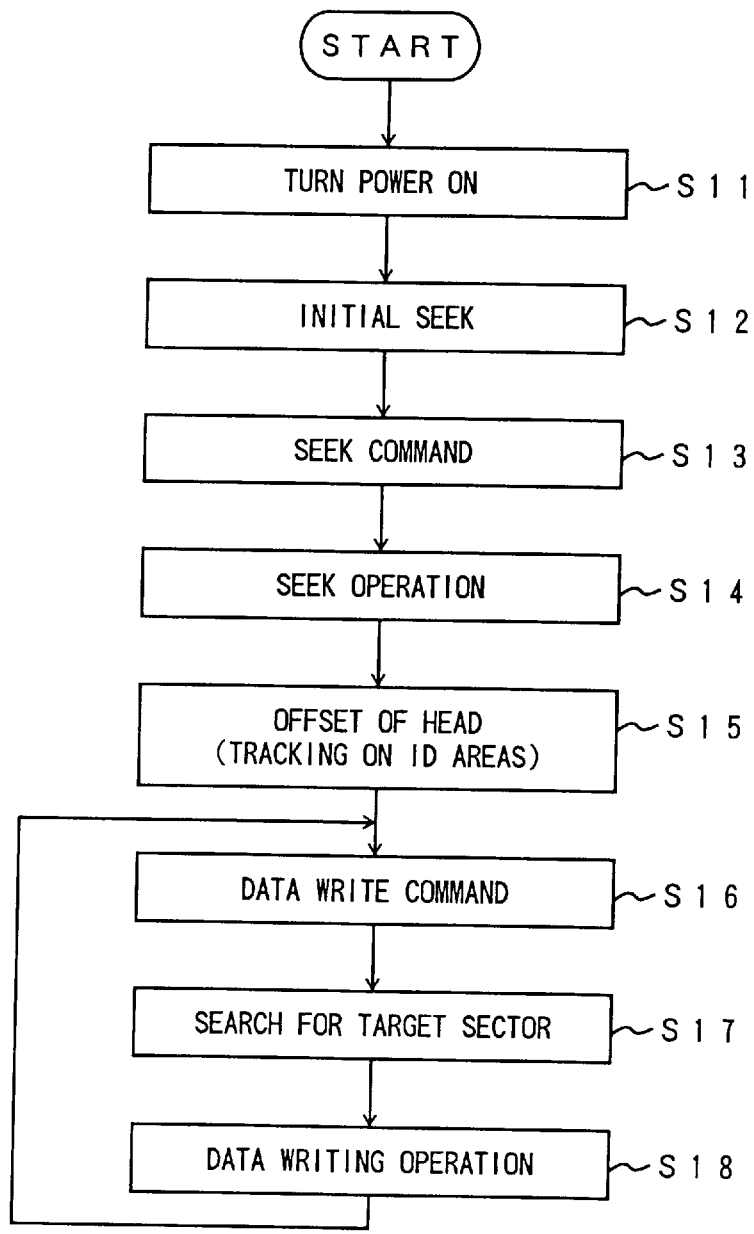
FIG. 9 is a flowchart of the data writing operation.

A description will now be given, with reference to FIG. 9, of a writing operation performed on the data area $82_1$b of the sector $82_1$ as a target sector. When a power of the magnetic disk apparatus 51 is turned on in step 11 (hereinafter step is abbreviated as S), the R/W head 64 is initially moved, in S12, to a track 00. Thereafter, when a seek command is input, in S13, from the upper apparatus, the R/W head 64 is moved, in S14, to the track 81.

The R/W head 64 is then offset to the ID areas 82a. This offset operation is completed when an output level of read signals from the ID areas 82a is a maximum. In this condition, the read head 64a is tracked on the ID areas 82a as shown in FIG. 8-(D) so as to wait for a data write command.

When the data write command is input in S16, the ID area $82_1$a of the target sector $82_1$ is searched for in S17. If a sector pulse is recorded on the magnetic disk for each sector, the sector pulse is read when a read gate is open as shown in FIG. 8-(A), (B). The searching operation for the ID area $82_1$a is completed when the sector pulse corresponds to the open period of the read gate. It should be noted that if the sector pulse is not recorded on the magnetic disk, the sector pulse is generated by using an index pulse.

Figure 8:
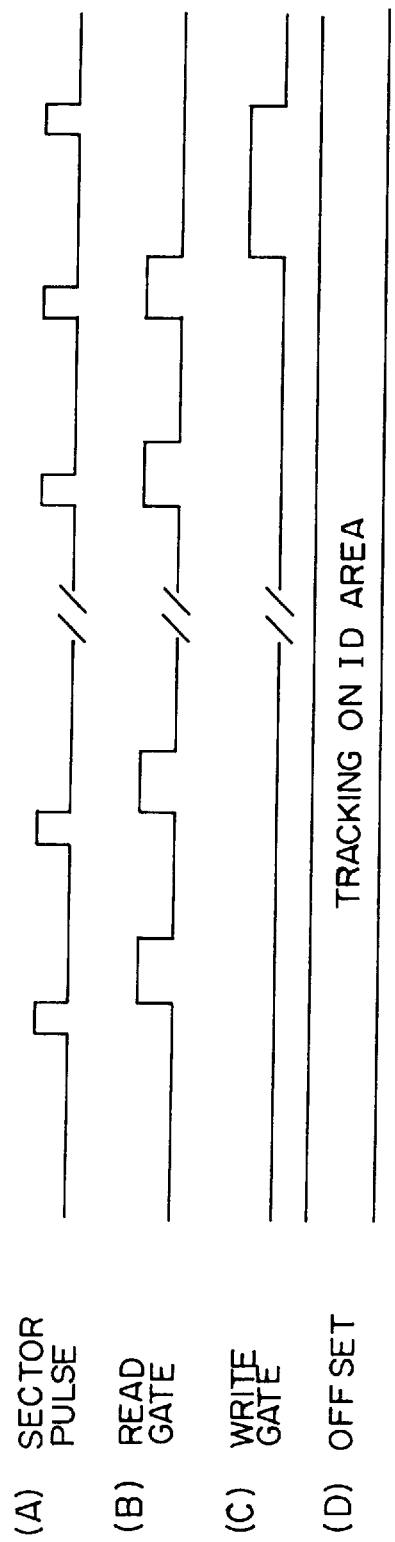
FIG. 8 is a timing chart of the data writing operation.

After the read head 64a tracks on the ID area $82_1$a as shown in FIG. 8-(D), a write gate is open as shown in FIG. 8-(C). A writing operation to the data area $82_1$b is then performed, in S18, by the write head 64b. Accordingly, since the R/W head 64 is not offset when the writing operation is performed, data is written in the data area $82_1$b which is displaced from the ID area $82_1$a as shown in FIG. 7.

As mentioned above, the read head 64a tracks on the ID area $82_1$a regardless of the yaw angle of the R/W head 64.

Figure 10:
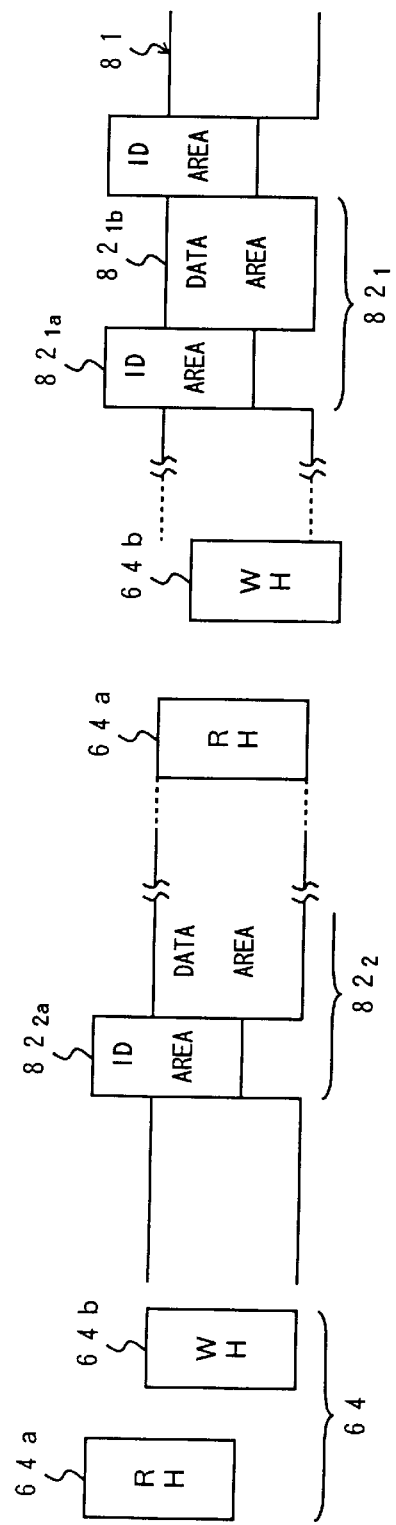
FIG. 10 is an illustration for explaining a data reading operation.
Figure 11:
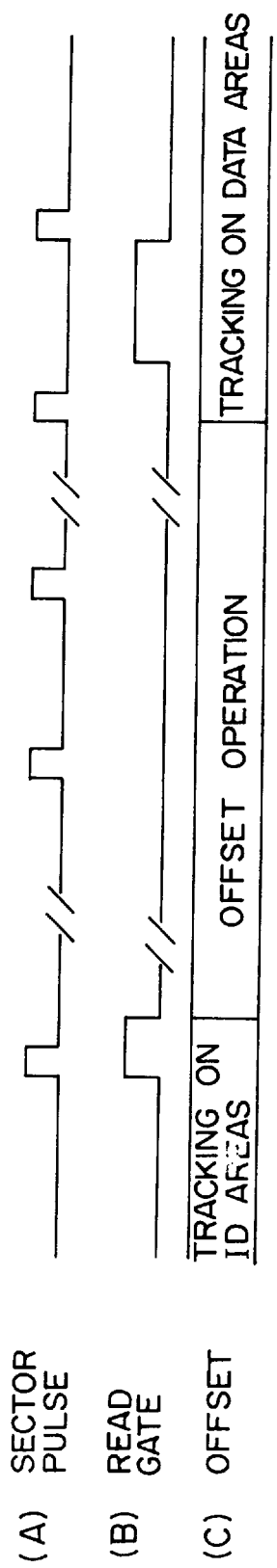
FIG. 11 is a timing chart of the data reading operation.
Figure 12:
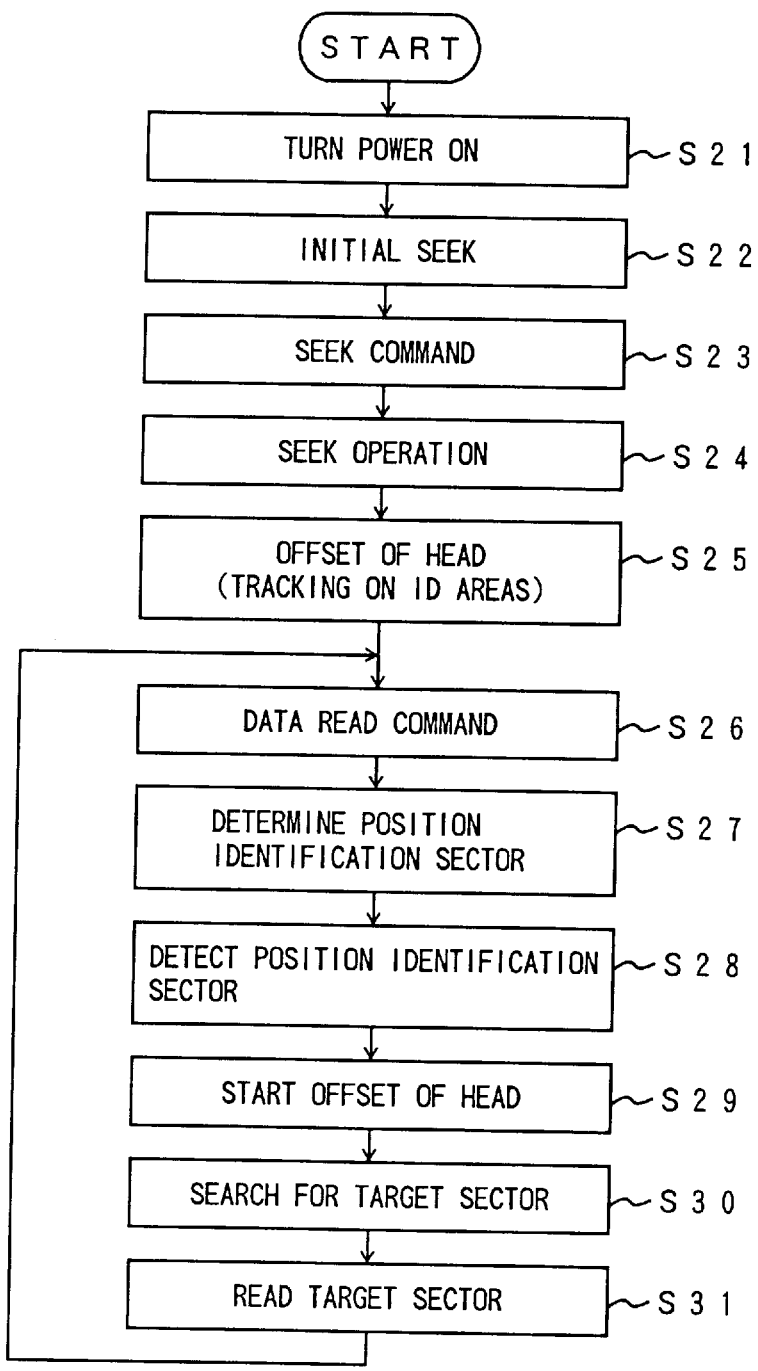
FIG. 12 is a flowchart of the data reading operation.

A description will now be given, with reference to FIGS. 10, 11 and 12, of a data reading operation. When a power of the magnetic disk apparatus 51 is turned on in S21, the R/W head 64 is initially moved to the track 00 in S22. Thereafter, when a seek command is input to seek the target track 81, in S23, from the upper apparatus, the R/W head 64 is moved to the target track 81 in S24. The R/W head 64 is then moved, in S25, so that the read head 64a tracks on the ID area $82_a$ as shown in FIG. 11-(C), and then the apparatus waits for an input of a data read command.

When the data read command is input in S26, the position identification sector determining means 71 calculates the number of sectors to be passed by the R/W head 64 while an offset of the R/W head 64 is being performed so as to determine, in S27, a sector $82_2$ as an identification sector which is the determined number of sectors ahead of the target sector $82_1$.

A period of time required for the offset is dependent on kinds of apparatus and is determined through design work or experiments. Information regarding the offset time and a period of time required for passing a single sector is stored in the table 76.

For example, if the period of time required for the offset is 1 ms and the period of time required for passing a single sector is 100 μs, the number of sectors to be passed by the R/W head 64 is 10. Accordingly, if the sector number of the target sector $82_1$ is 30, the sector number of the position identification sector is 20 which is 10 sectors ahead of the target sector $82_1$.

After the position identification sector $82_2$ is determined, the ID area searching means 72 searches, in S28, the position identification sector $82_2$ while the read head 64a reads ID information by tracking on the ID areas 82a. After the position identification sector $82_2$ is detected, the offset operation of the R/W head 64 is performed so that the read head 64a tracks on the data areas 82b. The offset operation is performed, in S29, by a command supplied by the offset commanding means 73 (refer to FIG. 11-(C)).

When the offset operation is performed, sector pulses recorded on the magnetic disk by the servo head 61 as servo information are read. The sector pulses are counted by the measuring means 74 to search for the target sector $82_1$ in S30 (refer to FIG. 11-(A), (B)). That is, a position of the target sector $82_1$ is identified by counting the sector pulses. For example, if 10 sector pulses are counted, this means 10 sectors are passed by the R/W head 64.

When the offset operation is performed, a read error may occur due to reading of ID areas 82a. In order to eliminate the read error, the read gate is closed to stop the read operation performed by the read head 64a as shown in FIG. 11-(B). Otherwise, the read error must be ignored when the offset operation is performed.

When the target sector $82_1$ is detected, the offset operation is completed. That is, the read head 64a tracks on the data areas 82b ($82_1$b) as shown in FIG. 11-(C). Thereafter, the read gate is open (FIG. 11-(B)) and the data reading operation to the data area $82_1$b of the target sector $82_1$ is performed in S31.

As mentioned above, in this embodiment, the offset operation is performed only when the data reading operation is performed for the data areas 82b. An average waiting time for the data reading operation is one half of a time required for one revolution of the magnetic disk plus a time required for the offset operation. This waiting time is shorter than a waiting time when the data area $82_1$b is read one revolution after the ID area $82_1$b of the target sector $82_1$ is read. Thus, the present embodiment achieves a high speed processing of the data reading operation.

Additionally, when the data reading operation is performed, the read head 64a tracks on the ID area $82_1$a and the data area $82_1$b, and thus an occurrence of a read error due to the yaw angle is reduced without reducing a width of the read head 64a. Thus, a high-level output is obtained from the read head 64a and the SNR is improved.

A description will now be given of a second embodiment of the magnetic disk apparatus according to the present invention. The mechanical construction of the second embodiment is the same as that of the first embodiment.

Figure 13:
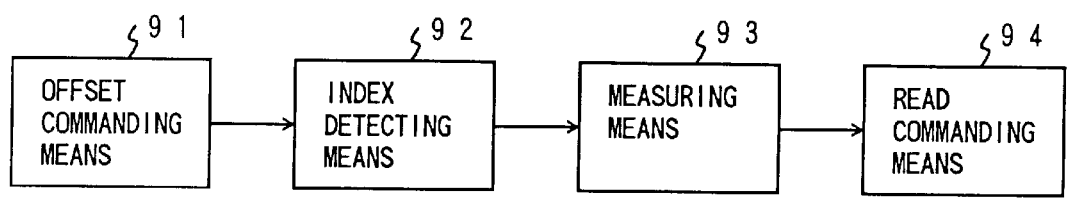
FIG. 13 is a block diagram of a hard disk controller of the second embodiment of the magnetic disk apparatus according to the present invention.

FIG. 13 is a block diagram of the HDC 52 of the second embodiment. The HDC 52 shown in FIG. 13 comprises offset commanding means 91, index detecting means 92, measuring means 93 and read commanding means 94. The offset commanding means 91 commands an offset of the read head 64a after the data read command is supplied. The index detecting means 92 detects an index signal after the offset operation is completed. The measuring means 93 counts the sector pulses after the index signal is detected. The read commanding means 94 commands a reading of the target sector.

Figure 14:
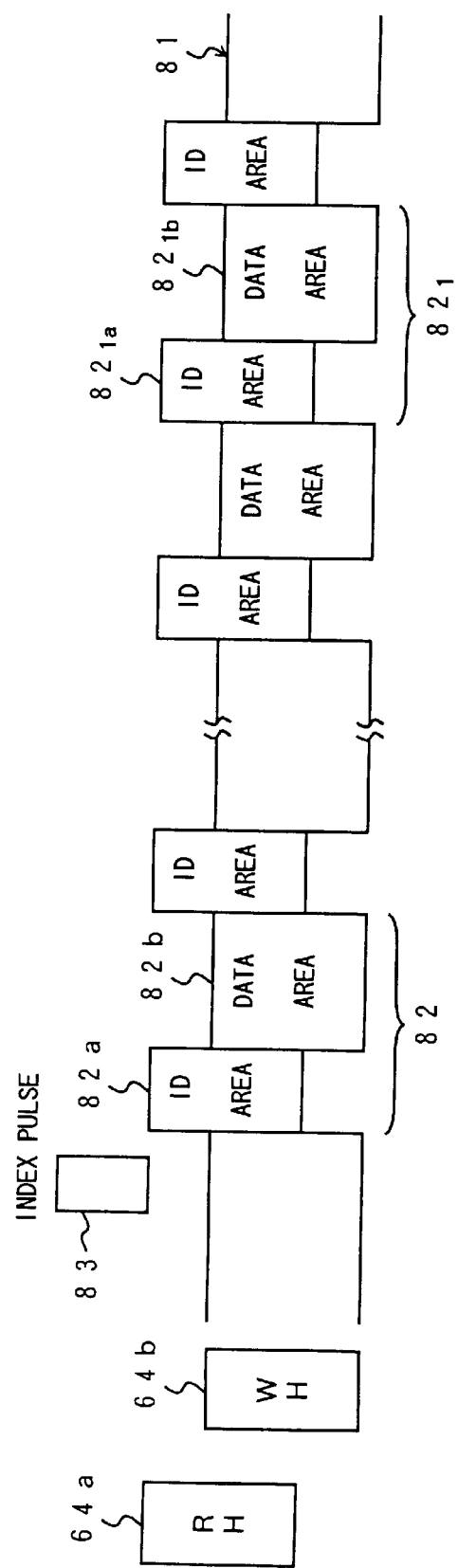
FIG. 14 is an illustration for explaining the second embodiment.
Figure 15:
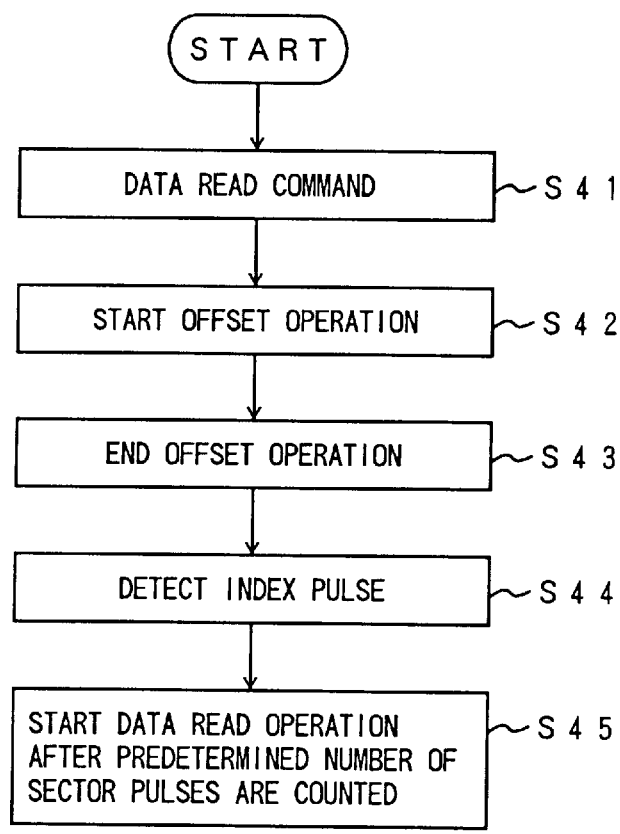
FIG. 15 is a flowchart of an operation of the second embodiment.

FIG. 14 is an illustration for explaining an operation of the second embodiment. FIG. 15 is a flowchart of an operation of the second embodiment. The data writing operation in the second embodiment is the same as that of the first embodiment. The steps from S21 to S25 of the first embodiment shown in FIG. 12 are also performed in the second embodiment, and these steps are omitted in FIG. 15.

In FIG. 15, when a data read command is input, in S41, from the upper apparatus in a state the R/W head 64 is tracking on the ID areas 82a of the track 81, the offset operation is immediately started by the offset commanding means 91 in S42. Since the period of time required for the offset operation has been determined by experiments beforehand, the offset operation is ended, in S43, when the period of time has elapsed. Thereafter, the index detecting means 92 detects, in S44, an index pulse 83 which is provided for each set of servo information on the magnetic disk by using the servo head 61.

After the index pulse 83 is detected, the sector pulses are counted by the measuring means 93 to detect the target sector $82_1$. The target sector is detected when the count number of sector pulses reaches a predetermined value. The read commanding means 94 reads, in S45, the data in the data area $82_1$b of the target sector $82_1$.

In this embodiment, an average waiting time from an input of the data read command to a start of the data reading operation corresponds to a time required for one revolution of the magnetic disk. Additionally, similarly to the first embodiment, occurrence of a read error due to the yaw angle is reduced without reducing a width of the read head 64a. Thus, a high-level output is obtained from the read head 64a and the SNR is improved.

The present invention is not limited to the specifically disclosed embodiments, and variations and modifications may be made without departing from the scope of the present invention.

What is claimed is:

1. A recording and reproducing apparatus for recording and reproducing data on a disk-like recording medium using a head having a read head for reproducing and a write head for recording, said head being moved substantially in a radial direction of said recording medium along an arc-like line, said recording medium having a track comprising a plurality of sectors each having a data area storing data and an identification area storing identification information of the data, said data area being displaced from said identification area due to movement of said head relative to said recording medium, said recording and reproducing apparatus comprising:

offset commanding means for performing an offset operation of said head when a data read command is supplied so that said head is moved from a first position to a second position, said read head tracking on said identification area when said head is at said first position and said read head tracking on said data area when said head is at said second position, wherein a read error is ignored during said offset operation;

index detecting means for detecting an index signal provided for each track on said recording medium when a predetermined period of time has elapsed since said offset operation was started;

measuring means for detecting a target sector on which a data read operation is to be performed when said index signal is detected, said target sector being detected by measuring a predetermined factor representing a period of time since said index signal was detected; and read commanding means for performing a data reading operation for said data area of said target sector when said target sector is detected.

2. The recording and reproducing apparatus as claimed in claim 1, wherein said predetermined factor is a number of sectors.

3. The recording and reproducing apparatus as claimed in claim 1, wherein said predetermined factor is a number of bytes.

4. The recording and reproducing apparatus as claimed in claim 1, further comprising:

writing means for performing a data writing operation to said data area of said target sector when said read head is tracking on said identification area of said target sector.

5. A recording and reproducing method for recording and reproducing data on a disk-like recording medium using a head having a read head for reproducing and a write head for recording, said head being moved substantially in a radial direction of said recording medium along an arc-like line, said recording medium having a track comprising a plurality of sectors each having a data area storing data and an identification area storing identification information of the data, said data area being displaced from said identification area due to movement of said head relative to said recording medium, said recording and reproducing method comprising the steps of:

a) determining a position identification sector which is positioned a predetermined number of sectors ahead of a target sector on which a reading operation is to be performed, said position identification sector being determined based on a table storing a period of time required for performing the offset operation and a predetermined factor representing said period of time;

b) detecting said position identification sector by said read head;

c) performing an offset operation of said head after said position identification sector is detected so that said head is moved from a first position to a second position, said read head tracking on said identification area when said head is at said first position and said read head tracking on said data area when said head is at said second position, and ignoring a read error occurring when said head is in said offset operation;

d) measuring said predetermined factor since said identification sector was detected; and e) performing a data reading operation when a measured value of said predetermined factor reaches a predetermined value.

6. A recording and reproducing apparatus for recording and reproducing data on a disk-like recording medium using a head having a read head for reproducing and a write head for recording, said head being moved substantially in a radial direction of said recording medium along an arc-like line, said recording medium having a track comprising a plurality of sectors each having a data area storing data and an identification area storing identification information of the data, said data area being displaced from said identification area due to movement of said head relative to said recording medium, said recording and reproducing apparatus comprising:

determining means for determining a position identification sector which is positioned a predetermined number of sectors ahead of a target sector on which a reading operation is to be performed, said position identification information being determined based on a table storing a period of time required for performing the offset operation and a predetermined factor representing said period of time;

search means for detecting said position identification sector by said read head;

offset commanding means for performing an offset operation of said head after said position identification sector is detected so that said head is moved from a first position to a second position, said read head tracking on said identification area when said head is at said first position and said read head tracking on said data area when said head is at said second position, wherein a read error is ignored during said offset operation;

measuring means for measuring said predetermined factor since said identification sector was detected;

read commanding means for performing a data reading operation when a measured value of said predetermined factor reaches a predetermined value.

7. A recording and reproducing method for recording and reproducing data on a disk-like recording medium using a head having a read head for reproducing and a write head for recording, said head being moved substantially in a radial direction of said recording medium along an arc-like line, said recording medium having a track comprising a plurality of sectors each having a data area storing data and an identification area storing identification information of the data, said data area being displaced from said identification area due to movement of said head relative to said recording medium, said recording and reproducing method comprising the steps of:

a) determining a position identification sector which is positioned a predetermined number of sectors ahead of a target sector on which a reading operation is to be performed, said position identification sector being determined based on a predetermined factor representing a period of time;

b) detecting said position identification sector by said read head;

c) performing an offset operation of said head after said position identification sector is detected so that said head is moved from a first position to a second position, said read head tracking on said identification area when said head is at said first position and said read head tracking on said data area when said head is at said second position, and ignoring a read error occurring when said head is in said offset operation;

d) measuring said predetermined factor since said identification sector was detected; and e) performing a data reading operation when a measured value of said predetermined factor reaches a predetermined value.

8. The recording and reproducing method as claimed in claim 7, wherein said predetermined factor is a number of sector pulses recorded on said recording medium.

9. The recording and reproducing method as claimed in claim 7, wherein said predetermined factor is a number of bytes included in said sectors.

10. The recording and reproducing method as claimed in claim 7, further comprising the step of:

f) performing a data writing operation to said data area of said target sector when said read head is tracking on said identification area of said target sector.

11. The recording and reproducing method as claimed in claim 7, wherein the reading operation of said head is stopped when said head is in said offset operation.

12. A recording and reproducing method for recording and reproducing data on a disk-like recording medium using a head having a read head for reproducing and a write head for recording, said head being moved substantially in a radial direction of said recording medium along an arc-like line, said recording medium having a track comprising a plurality of sectors each having a data area storing data and an identification area storing identification information of the data, said data area being displaced from said identification area due to movement of said head relative to said recording medium, said recording and reproducing method comprising the steps of:

a) performing an offset operation of said head when a data read command is supplied so that said head is moved from a first position to a second position, said read head tracking on said identification area when said head is at said first position and said read head tracking on said data area when said head is at said second position, and ignoring a read error occurring when said head is in said offset operation;

b) detecting an index signal provided for each track on said recording medium when a predetermined period of time has elapsed since said offset operation was started;

c) detecting a target sector on which a data read operation is to be performed when said index signal is detected, said target sector being detected by measuring a predetermined factor representing a period of time since said index signal was detected; and d) performing a data reading operation for said data area of said target sector when said target sector is detected.

13. The recording and reproducing method as claimed in claim 12, wherein said predetermined factor is a number of sectors.

14. The recording and reproducing method as claimed in claim 12, wherein said predetermined factor is a number of bytes.

15. The recording and reproducing method as claimed in claim 12, further comprising the step of:

e) performing a data writing operation to said data area of said target sector when said read head is tracking on said identification area of said target sector.

16. A recording and reproducing apparatus for recording and reproducing data on a disk-like recording medium using a head having a read head for reproducing and a write head for recording, said head being moved substantially in a radial direction of said recording medium along an arc-like line, said recording medium having a track comprising a plurality of sectors each having a data area storing data and an identification area storing identification information of the data, said data area being displaced from said identification area due to movement of said head relative to said recording medium, said recording and reproducing apparatus comprising:

determining means for determining a position identification sector which is positioned a predetermined number of sectors ahead of a target sector on which a reading operation is to be performed, said position identification information being determined based on a predetermined factor representing a period of time;

search means for detecting said position identification sector by said read head;

offset commanding means for performing an offset operation of said head after said position identification sector is detected so that said head is moved from a first position to a second position, said read head tracking on said identification area when said head is at said first position and said read head tracking on said data area when said head is at said second position, wherein a read error is ignored during said offset operation;

measuring means for measuring said predetermined factor since said identification sector was detected;

read commanding means for performing a data reading operation when a measured value of said predetermined factor reaches a predetermined value.

17. The recording and reproducing apparatus as claimed in claim 16, wherein said predetermined factor is a number of sector pulses recorded on said recording medium.

18. The recording and reproducing apparatus as claimed in claim 16, wherein said predetermined factor is a number of bytes included in said sectors.

19. The recording and reproducing apparatus as claimed in claim 16, further comprising:

data writing means for performing a data writing operation to said data area of said target sector when said read head is tracking on said identification area of said target sector.

20. The recording and reproducing apparatus as claimed in claim 16, wherein the reading operation of said head is stopped when said head is in said offset operation.

* * * * *